(12) United States Patent
Yao et al.

(10) Patent No.: US 9,545,613 B2
(45) Date of Patent: *Jan. 17, 2017

(54) SYSTEMS FOR CONVERTING ETHANE AND ETHANOL TO LIQUID TRANSPORTATION FUELS

(71) Applicant: Phillips 66 Company, Houston, TX (US)

(72) Inventors: Jianhua Yao, Bartlesville, OK (US); Dhananjay Ghonasgi, Bartlesville, OK (US); Tushar Choudhary, Bartlesville, OK (US); Warren Ewert, Bartlesville, OK (US)

(73) Assignee: Phillips 66 Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/571,911

(22) Filed: Dec. 16, 2014

(65) Prior Publication Data

US 2015/0196892 A1    Jul. 16, 2015

Related U.S. Application Data

(60) Provisional application No. 61/919,456, filed on Dec. 20, 2013, provisional application No. 61/919,465, (Continued)

(51) Int. Cl.
*B01J 19/00* (2006.01)
*B01J 19/24* (2006.01)
(Continued)

(52) U.S. Cl.
CPC .............. *B01J 19/245* (2013.01); *C10G 50/00* (2013.01); *C10G 57/02* (2013.01); *C10G 59/02* (2013.01);
(Continued)

(58) Field of Classification Search
CPC ........... B01J 19/00; B01J 19/24; B01J 19/245; B01J 2219/00049; B01J 2219/00051; C10G 50/00; C10G 57/00; C10G 57/02; C10G 59/00; C10G 59/02; C10G 63/00; C10G 63/02; C10G 2300/10; C10G 2300/1081; C10L 2200/04–2200/0423; C10L 2200/0438; C10L 2200/0446; C10L 2230/14; C10L 2270/02; C10L 2270/026; C10L 2290/06; C10L 2290/10; C10L 2290/54; C10L 2290/543; C10L 2290/544

See application file for complete search history.

(56) References Cited

U.S. PATENT DOCUMENTS

| | | | |
|---|---|---|---|
| 4,891,457 A * | 1/1990 | Owen | ...................... C07C 2/12 585/312 |
| 2011/0067305 A1* | 3/2011 | Morris | ..................... C10G 9/00 48/127.5 |

(Continued)

*Primary Examiner* — Natasha Young
(74) *Attorney, Agent, or Firm* — Phillips 66 Company (57) ABSTRACT

Systems relating to thermal activation (or cracking) of ethane to an intermediate, low purity raw ethylene stream in a first stage. The system then mixes this stream with a stream of raw biomass-derived ethanol that may contain more than four volume percent of water. The resulting mixture is reacted over a suitable catalyst at temperatures and pressures suitable to produce gasoline-range and diesel-range blend stock.

15 Claims, 8 Drawing Sheets

Related U.S. Application Data filed on Dec. 20, 2013, provisional application No. 61/919,480, filed on Dec. 20, 2013, provisional application No. 61/919,493, filed on Dec. 20, 2013, provisional application No. 62/008,296, filed on Jun. 5, 2014, provisional application No. 62/008,303, filed on Jun. 5, 2014.

(51) Int. Cl.
  *C10G 50/00* (2006.01)
  *C10G 59/00* (2006.01)
  *C10G 59/02* (2006.01)
  *C10G 63/00* (2006.01)
  *C10G 63/02* (2006.01)
  *C10G 57/02* (2006.01)
  *C10L 1/04* (2006.01)
  *C10L 1/06* (2006.01)

(52) U.S. Cl.
  CPC .............. *C10G 63/02* (2013.01); *C10L 1/04* (2013.01); *C10L 1/06* (2013.01); *B01J 2219/00051* (2013.01); *B01J 2219/24* (2013.01); *C10G 2300/1081* (2013.01); *C10L 2200/0423* (2013.01); *C10L 2200/0446* (2013.01); *C10L 2230/14* (2013.01); *C10L 2270/026* (2013.01)

(56) References Cited

U.S. PATENT DOCUMENTS

2011/0071331 A1* 3/2011 Basset .................... B01J 31/121
  585/700
2015/0175908 A1* 6/2015 Yao .......................... C07C 2/42
  585/256

* cited by examiner

SYSTEMS FOR CONVERTING ETHANE AND ETHANOL TO LIQUID TRANSPORTATION FUELS

CROSS-REFERENCE TO RELATED APPLICATIONS

This application is a non-provisional application which claims benefit under 35 USC §119(e) to U.S. Provisional Application Ser. No. 61/919,456 filed Dec. 20, 2013, entitled "CONVERTING ETHANE TO LIQUID FUELS AND CHEMICALS," and to U.S. Provisional Application Ser. No. 61/919,465 filed Dec. 20, 2013, entitled "CONVERTING ETHANE TO LIQUID FUELS AND CHEMICALS," and to U.S. Provisional Application Ser. No. 61/919,480 filed Dec. 20, 2013, entitled "CONVERTING ETHANE TO LIQUID FUELS AND CHEMICALS," and to U.S. Provisional Application Ser. No. 61/919,493 filed Dec. 20, 2013, entitled "CONVERTING ETHANE TO LIQUID FUELS AND CHEMICALS," and to U.S. Provisional Application Ser. No. 62/008,296 filed Jun. 5, 2014, entitled "ETHANE AND ETHANOL TO LIQUID TRANSPORTATION FUELS," and to U.S. Provisional Application Ser. No. 62/008,303 filed Jun. 5, 2013, entitled "SYSTEMS FOR CONVERTING ETHANE AND ETHANOL TO LIQUID TRANSPORTATION FUELS," all six of which are incorporated herein by reference in their entirety.

STATEMENT REGARDING FEDERALLY SPONSORED RESEARCH OR DEVELOPMENT

None.

FIELD OF THE INVENTION

The present invention relates to a process that co-converts ethane and biomass-derived ethanol to liquid hydrocarbons fuels.

BACKGROUND OF THE INVENTION

Technology advancements in horizontal drilling and hydraulic fracturing techniques (or fracking) have boosted efficiency in production of natural gas from shale. These advances have also led to an increase in natural gas liquids (NGLs) production. The NGLs include hydrocarbons such as ethane, butane, and propane, which are valued as raw materials in the petrochemical markets. Ethane is used as the feedstock for production of high purity ethylene (high capital expense process due to purity constraint), which is a valuable feedstock for several chemicals (e.g., polyethylene, ethylene oxide, ethylene glycol, vinyl chloride monomer, etc.).

While it is easy to liquefy propane/butanes, it is much more energy intensive to liquefy ethane, making economic transportation of ethane challenging and expensive. What is needed are cost-effective processes and systems that can convert ethane into more valuable fuels that are more easily transported.

In the US, government mandates have required increasing quantities of biomass-derived ethanol to be blended into transportation fuels. Due to concurrent reductions in US gasoline production and consumption, the quantity of ethanol blended into gasoline may soon exceed 10%, which may have implications for the operability of certain older vehicles not designed to utilize such fuels. Additionally, blending of increasing quantities of biomass-derived ethanol into fuels increases the overall Reid Vapor pressure to levels that exceed government mandated levels. Accordingly, a need also exists for methods and systems to allow incorporation of increased quantities of biomass-derived ethanol into gasoline, while preserving the ability to utilize the resulting fuel in all gasoline-powered vehicles and maintaining the Reid vapor pressure of the fuel at acceptable levels.

BRIEF SUMMARY OF THE DISCLOSURE

In certain embodiments, the systems disclosed herein pertain to the thermal activation (or cracking) of ethane to an intermediate, low purity raw ethylene stream (as low as ~30 vol % ethylene) in a first stage. The systems then combine this stream with a stream of biomass-derived ethanol and react the resulting mixture over a suitable catalyst to produce gasoline range blend stock. Prior to recycling, unconverted gaseous product are optionally hydrogenated.

Certain embodiments of the invention comprise a system for converting ethane to liquid fuels, including an ethane stream and a thermal activation unit adapted to operate at an internal temperature of between about 500° C. and about 1000° C. The thermal activation unit is adapted to convert the ethane stream to products comprising an intermediate hydrocarbon stream and a raw ethylene stream comprising less than 60 weight percent ethylene. In certain embodiments, the thermal activation unit is adapted to produce a raw ethylene stream comprising less than 50, less than 40, or even less than 35 weight percent ethylene. The thermal activation unit in turn comprises: at least one inlet for receiving the ethane stream, at least a first outlet for the intermediate hydrocarbon stream, at least a second outlet for the raw ethylene stream.

The system additionally comprises a conversion unit adapted to operate at an internal temperature of between about 20° C. and 400° C. The conversion unit comprises at least one catalyst contained within, at least a first inlet adapted to receive the raw ethylene stream, at least a second inlet adapted to receive a raw ethanol stream that is derived from biomass and comprises at least 4 volume percent water, and at least one outlet to convey a mixed product stream to a separation column. The arrangement of the at least one first inlet and the at least one second inlet on the conversion unit are adapted to facilitate rapid mixing of the raw ethylene stream with the raw ethanol stream to form a mixture and convert the water to steam prior to contacting the at least one catalyst. In certain embodiments, the catalyst comprises a solid phosphoric acid catalyst, zeolite catalyst, Ni-containing catalyst or mixtures of these.

The system additionally comprises a separation column adapted to receive and separate the mixed product stream into an intermediate hydrocarbon stream comprising hydrocarbons containing four or more carbon atoms and a light hydrocarbon stream comprising hydrocarbons containing from one to three carbon atoms.

In certain embodiments, the system further comprises a fractionator adapted to separate the intermediate hydrocarbon stream into a gasoline fraction suitable for blending into gasoline fuel, and a diesel fraction suitable for blending into diesel fuel.

In certain embodiments, the system further comprises a separator adapted to receive the raw ethylene stream and to separate a hydrogen stream from the raw ethylene stream prior to combining the raw ethylene stream with the raw ethanol stream.

In certain embodiments, The system further comprises a hydrogenation reactor adapted to receive and hydrogenate at least part of the light hydrocarbon stream and produce a mixture comprising light paraffins stream and hydrogen gas, a separator adapted to receive the mixture and separate the hydrogen gas from the light paraffins stream, a conduit adapted to receive and convey the light paraffins stream, and a natural gas fractionator adapted to receive the light paraffins stream and produce the ethane stream. The conduit may optionally be adapted to instead convey the light paraffins stream from the separator to the thermal activation unit.

BRIEF DESCRIPTION OF THE DRAWINGS

A more complete understanding of the present invention and benefits thereof may be acquired by referring to the follow description taken in conjunction with the accompanying drawings in which.

The invention is susceptible to various modifications and alternative forms, specific embodiments thereof are shown by way of example in the drawings. The drawings may not be to scale. It should be understood that the drawings and their accompanying detailed descriptions are not intended to limit the scope of the invention to the particular form disclosed, but rather, the intention is to cover all modifications, equivalents and alternatives falling within the spirit and scope of the present invention as defined by the appended claims.

DETAILED DESCRIPTION

Various exemplary embodiments of the inventive processes and systems will now be described in detail.

Figure 1:
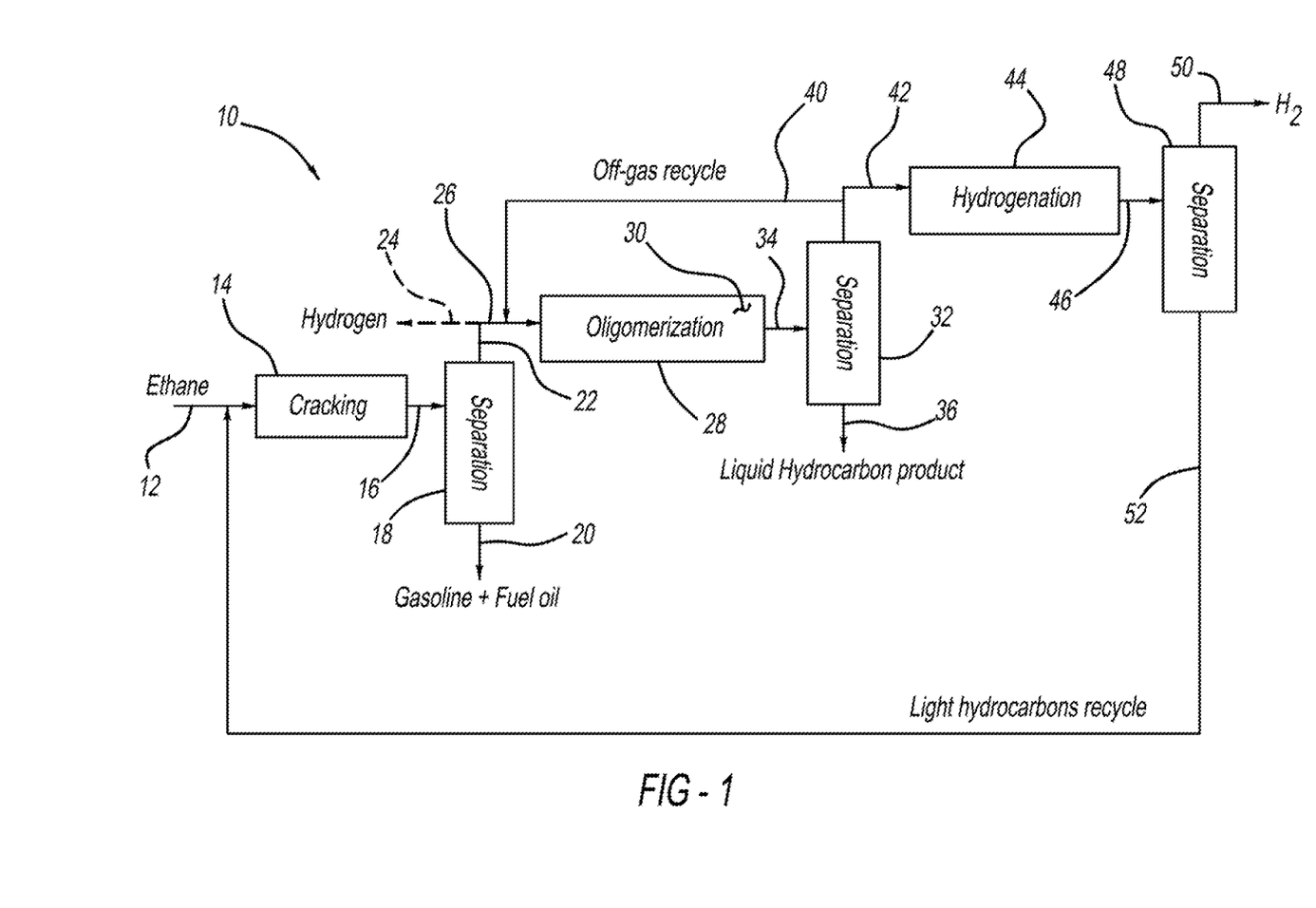
FIG. 1 is a schematic diagram depicting components and a process for converting ethane gas to liquid fuels.

FIG. 1 is a schematic diagram of an ethane conversion process 10 depicting components used to process ethane gas and convert it to liquid fuels. Ethane from an ethane stream 12 may be fed directly into a cracking unit 14. Upon exiting the cracking unit 14, an intermediate hydrocarbon product 16 is delivered directly into a separation unit 18, which produces a pyrolysis gasoline/fuel oil stream 20 and a raw ethylene stream 22 consisting of hydrogen, methane, unconverted ethane, ethylene, acetylene, propane, propylene, acid gases, and other gaseous products. Optionally, hydrogen may be separated out of the raw ethylene stream 22 in a hydrogen stream 24, thus resulting in a feed stream 26 that includes methane, unconverted ethane, ethylene, acetylene, propane, propylene, acid gases, and other gaseous products. Absent hydrogen, feed stream 26 is fed into an oligomerization reactor 28 containing an oligomerization catalyst 30. Feed stream 26 contacts the oligomerization catalyst 30 and two streams are formed upon the treated stream 34 exiting a separation unit 32; a liquid hydrocarbon stream 36 and an off-gas stream 38. Off-gas stream 38 is divided into an off-gas recycle stream 40 that may be re-directed or recycled back into and merged with feed stream 26, and a hydrogenation stream 42 that is directed directly into hydrogenation unit 44. Recycling the off-gas stream 38 as off-gas recycle stream 40 and directing it to an inlet of oligomerization reactor 28 may be required to improve ethylene conversion and may optionally assist in controlling the temperature of the oligomerization reactor 28. The catalyst used for this oligomerization reaction can be solid phosphoric acid catalyst, zeolite catalyst, Ni-containing catalyst or any combination of such catalysts. Liquid hydrocarbon stream 36 may be further fractionated into a gasoline fraction and a diesel fraction as gasoline and diesel blending stocks, respectively. Hydrogenation stream 42 is introduced into a hydrogenation reactor 44 to remove unconverted olefins thereby yielding a light paraffin and hydrogen mixture stream 46. Light paraffin and hydrogen mixture stream 46 is then introduced into a separation unit 48, where a separation technology or method, such as pressure swing adsorption (PSA) technology or membrane technology to separate light paraffin and hydrogen mixture stream 46 into a hydrogen stream 50 and light hydrocarbons recycle stream 52. Optionally, light hydrocarbons recycle stream 52 can be recycled back to the feed of the cracking unit.

There are numerous advantages to the ethane conversion process depicted in FIG. 1. FIG. 1 includes an ethane cracking stage to produce an intermediate hydrocarbon stream in a first stage that is subsequently converted to clean fuels, such as gasoline and diesel fuel, in a separate stage. Another advantage is that a significant portion of the gaseous product from the second stage is recycled back to the first cracking stage. More specifically, light hydrocarbons recycle stream 52 is recycled back to the ethane stream 12 that enters cracking unit 14, which is an ethane cracking unit. By directing light hydrocarbon recycle stream 52 back into cracking unit 14 as a recycle stream, a high efficiency of ethane conversion (e.g. greater than 80%) is ensured. Before light hydrocarbon recycle stream 52 is recycled, thereby becoming part of ethane stream 12 that enters cracking unit 14, it is first directed into and passes through a hydrogenation reactor unit 44 to eliminate any unreacted ethylene and other light olefins from the second stage, which includes an oligomerization unit 28 and subsequent separation unit 32. Because light hydrocarbon recycle stream 52 has passed through hydrogenation reactor unit 44 and subsequent separation unit 48, fouling of the ethane cracking unit 14 and subsequent separation unit 18 is avoided. The ethane concentration of ethane stream 12 may be 70%, or slightly less than 70% or slightly more than 70%. This high ethane concentration in ethane stream 12 contributes to preventing the fouling of components depicted in FIG. 1 and the overall efficiency of ethane conversion process 10. Cracking of ethane stream 12 within ethane cracking unit 14 may be accomplished with catalytic cracking, non-catalytic cracking, oxy-steam cracking or some form of conventional steam cracking. In other words, the process depicted in and described in conjunction with FIG. 1, is not limited regarding ethane cracking methodology. Another advantage of ethane conversion process 10 is that the intermediate hydrocarbon product 16 that enters the second stage of ethane conversion process 10 may have a concentration of ethylene that varies from 30%-80% (inclusive), and may have a concentration of ethane that varies from 20%-60% (inclusive); all other hydrocarbons in the hydrocarbon stream of the second stage are less than 10%. Another advantage of ethane conversion process 10 is that it is not restricted to any particular catalyst system. In other words, numerous catalyst options exist and may be utilized in the second stage of ethane conversion process 10. The second stage of ethane conversion process 10 is a reactor (e.g, oligomerization unit 28) that upgrades the intermediate hydrocarbon product 16 produced from the first cracking stage to produce clean fuels. This is a unique process in and of itself within the ethane conversion process 10. Another unique or distinguishing feature is that the first stage optionally does not require catalyst regeneration (i.e. intermittent oxidative treatments to recover catalyst activity). However, the second stage catalyst may be regenerated, as depicted in FIG. 2.

Figure 2:
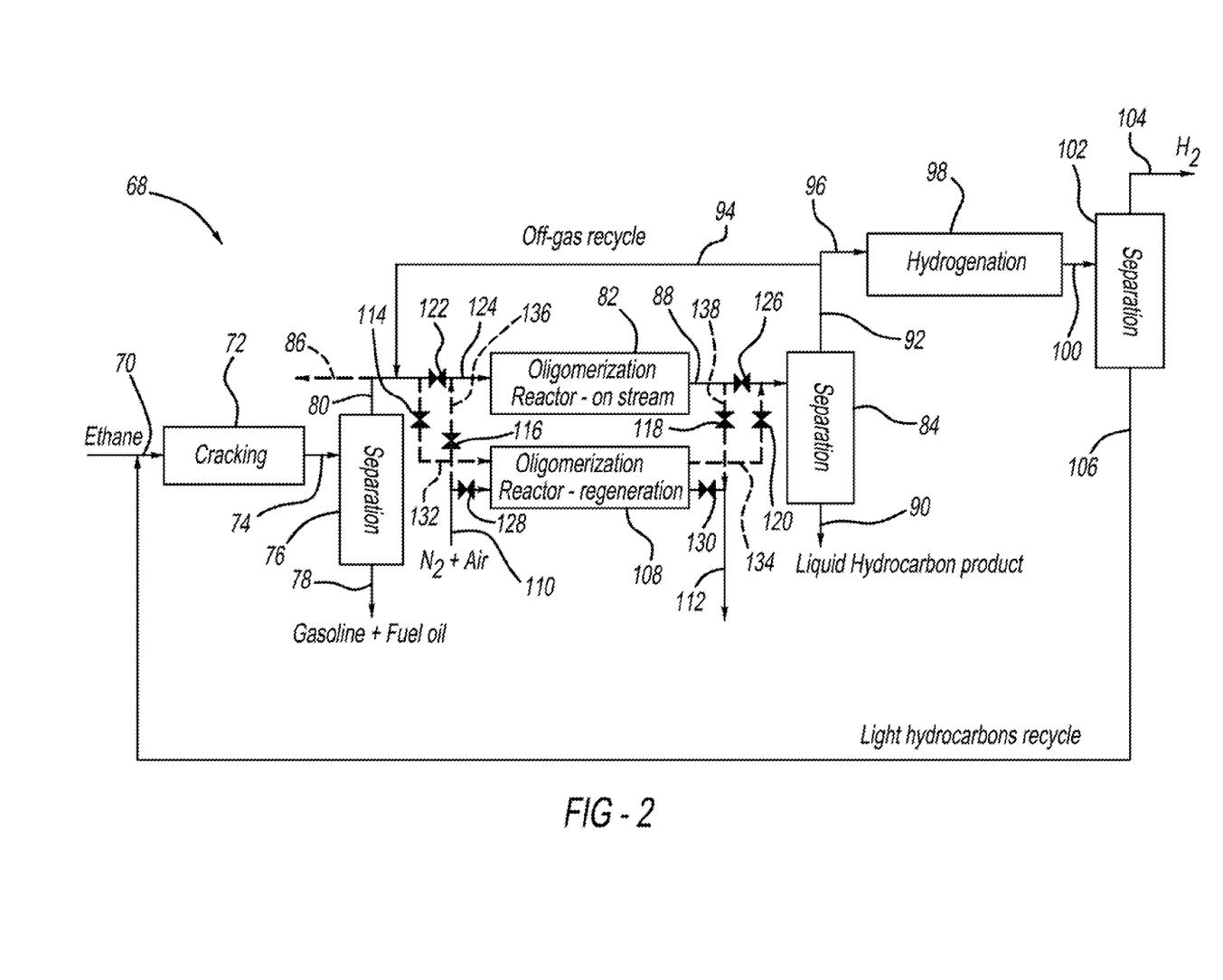
FIG. 2 is a schematic diagram depicting components and a process for converting ethane gas to liquid fuels, including regeneration.

FIG. 2 depicts an ethane conversion process 68 including components used to convert ethane gas to liquid fuels, including catalyst regeneration for oligomerization. More specifically, ethane from an ethane stream 70 may be fed directly into a cracking unit 72. Upon exiting the cracking unit 72, a feed stream 74 is delivered directly into a separation unit 76, which produces a small pyrolysis gasoline/fuel oil stream 78 and a raw ethylene stream 80 consisting of hydrogen, methane, unconverted ethane, ethylene, acetylene, propane, propylene, acid gases, and other gaseous products. Optionally, hydrogen may be separated out of the raw ethylene stream 80 in a hydrogen stream 86, thus resulting in a feed stream 80 that possesses methane, unconverted ethane, ethylene, acetylene, propane, propylene, acid gases, and other gaseous products. Raw ethylene stream 80 is next fed into an oligomerization reactor (on stream) 82 containing an oligomerization catalyst. Raw ethylene stream 80 contacts the oligomerization catalyst within oligomerization reactor (on stream) 82, exits as a treated stream 88, which then enters a separation unit 84. Two streams exit separation unit 84: a liquid hydrocarbon stream 90 and an off-gas stream 92. Off-gas stream 92 may be divided into an off-gas recycle stream 94 that may be re-directed or recycled and merged with raw ethylene stream 80, and a hydrogenation stream 96 that is directed directly into hydrogenation unit 98. Alternatively, recycling at least a portion of the off-gas stream 92 as off-gas recycle stream 94 to be combined with raw ethylene stream 80 may serve to improve ethylene conversion in oligomerization reactor 82. The catalyst used for oligomerization reactions can be solid phosphoric acid catalyst, zeolite catalyst, Ni-containing catalyst or any combination of such catalysts. Liquid hydrocarbon stream 90 may be further fractionated into a gasoline fraction and a diesel fraction as gasoline and diesel blending stocks, respectively. Hydrogenation stream 96 is introduced into a hydrogenation reactor 98 to remove unconverted light olefins, thereby yielding a light paraffin and hydrogen mixture stream 100. Light paraffin and hydrogen mixture stream 100 is then introduced into a separation unit 102, where a separation technology or method, such as pressure swing adsorption (PSA) technology or membrane technology separates light paraffin and hydrogen mixture stream 100 into a hydrogen stream 104 and light hydrocarbons recycle stream 106. Light hydrocarbons recycle stream 106 is then recombined with ethane stream 70 upstream from cracking unit 72.

Further referring to FIG. 2, oligomerization reactor (regeneration) 108 may optionally be included as a component in the system of FIG. 2 for the benefit that while one oligomerization reactor is in operation, another oligomerization reactor may be regenerating to recover the catalyst activity within the reactor. For example, oligomerization reactor (on stream) 82 may be operating, as described above, while oligomerization reactor (regenerating) 108 may be regenerating. Oligomerization reactor (on stream) 82 and oligomerization reactor (regenerating) 108 may switch back and forth in their functions (on stream operation vs. regeneration), as depicted using the dashed lines in FIG. 2, and may be known as a swing unit. More specifically, as depicted in FIG. 2, when oligomerization reactor (on stream) 82 is operating within ethane conversion process 68, oligomerization reactor (regenerating) 108 is in a regeneration mode. When in regeneration mode, oligomerization reactor (regenerating) 108 is not in fluid communication with ethylene feed stream 80. This means that Nitrogen ($N_2$) and air line 110 directs Nitrogen ($N_2$) and air directly into oligomerization reactor (regenerating) 108 to facilitate regeneration of the catalyst being employed within oligomerization reactor (regenerating) 108. Discharge line 112 takes away or removes any byproducts of the regeneration of the catalyst within oligomerization reactor (regenerating) 108 during regeneration, and valves 114, 116, 118, and 120 are closed during regeneration to prevent interference with the operation of oligomerization reactor (on stream) 82.

When regeneration of oligomerization reactor (regenerating) 108 is complete and ready to be put back on-line or on-stream, and oligomerization reactor (on stream) 82 is ready to be taken off-line or off-stream for regeneration, valves 114 and 120 are opened to permit ethylene feed stream 80 to access oligomerization reactor 108 to permit ethane to liquid fuels process 68 to continue, and valves 122, 126, 128, and 130 are closed, and valves 116 and 118 are opened to only permit the flow of Nitrogen ($N_2$) and air into oligomerization reactor 82, and not into any other lines or oligomerization reactor 82. With such a swing or alternating operation of oligomerization reactors 82, 108, continuous or near continuous operation of ethane to liquid fuels process 68 is possible. Valve 114 controls access to ethylene line 132, valve 120 controls access through treated ethylene line 134. Valve 116 controls access of Nitrogen ($N_2$) and air in Nitrogen (N2) and air line 136. Valve 118 control access to discharge line 112 for oligomerization reactor 82.

There are numerous advantages to the ethane conversion processes depicted in FIGS. 1 and 2. FIGS. 1 and 2 include an ethane cracking stage to produce an intermediate hydrocarbon stream in a first stage that is subsequently converted to clean fuels, such as gasoline and diesel fuel, in a separate stage. Another advantage is that a significant portion of the gaseous product from the second stage is recycled back to the first cracking stage. More specifically, as depicted in FIG. 1, light hydrocarbons recycle stream 52 is recycled back to the ethane stream 12 that enters cracking unit 14, which is an ethane cracking unit. By directing light hydrocarbon recycle stream 52 back into cracking unit 14 as a recycle stream, a high efficiency of ethane conversion (e.g. greater than 80%) is ensured. Before light hydrocarbon recycle stream 52 is recycled and thereby becoming part of ethane stream 12 that enters cracking unit 14, it is first directed into and passes through a hydrogenation reactor unit 44 to eliminate any unreacted ethylene from the second stage, which includes an oligomerization unit 28 and subsequent separation unit 32. Because light hydrocarbon recycle stream 52 has passed through hydrogenation reactor unit 44 and subsequent separation unit 48, fouling of ethane cracking unit 14 and subsequent separation unit 18 is avoided. Also contributing to anti-fouling of components depicted in FIG. 1 and the overall efficiency of ethane conversion process 10 is the ethane concentration of ethane stream 12 that is directed into cracking unit 14. The ethane concentration of ethane stream 12 may be 70%, or slightly less than 70% or slightly more than 70%. Cracking of ethane stream 12 within ethane cracking unit 14 may be accomplished with catalytic cracking, non-catalytic cracking, oxy-steam cracking or some form of conventional steam cracking. In other words, the process depicted in and described in conjunction with FIG. 1, is not limited regarding ethane cracking methodology. With continued reference to FIG. 1, another advantage of ethane conversion process 10 is that the intermediate hydrocarbon stream that enters the second stage of ethane conversion process 10 may have a concentration of ethylene that varies from 30%-80% (inclusive), and may have a concentration of ethane that varies from 20%-60% (inclusive); all other hydrocarbons in the hydrocarbon stream of the second stage are less than 10%. Another advantage of ethane conversion process 10 is that it is not restricted to any particular catalyst system. In other words, numerous catalyst options exist and may be utilized in the second stage of ethane conversion process 10. The second stage of ethane conversion process 10 is a reactor (i.e. oligomerization unit 28) that upgrades the intermediate product produced from the first cracking stage to produce clean fuels. This is a unique process in and of itself within ethane conversion process 10. Although advantages have been discussed using FIG. 1, the same advantages are evident with the process depicted in FIG. 2, which has the added advantage of simultaneously conducting oligomerization in one unit, while regenerating the catalyst of an off-line oligomerization unit.

Figure 3:
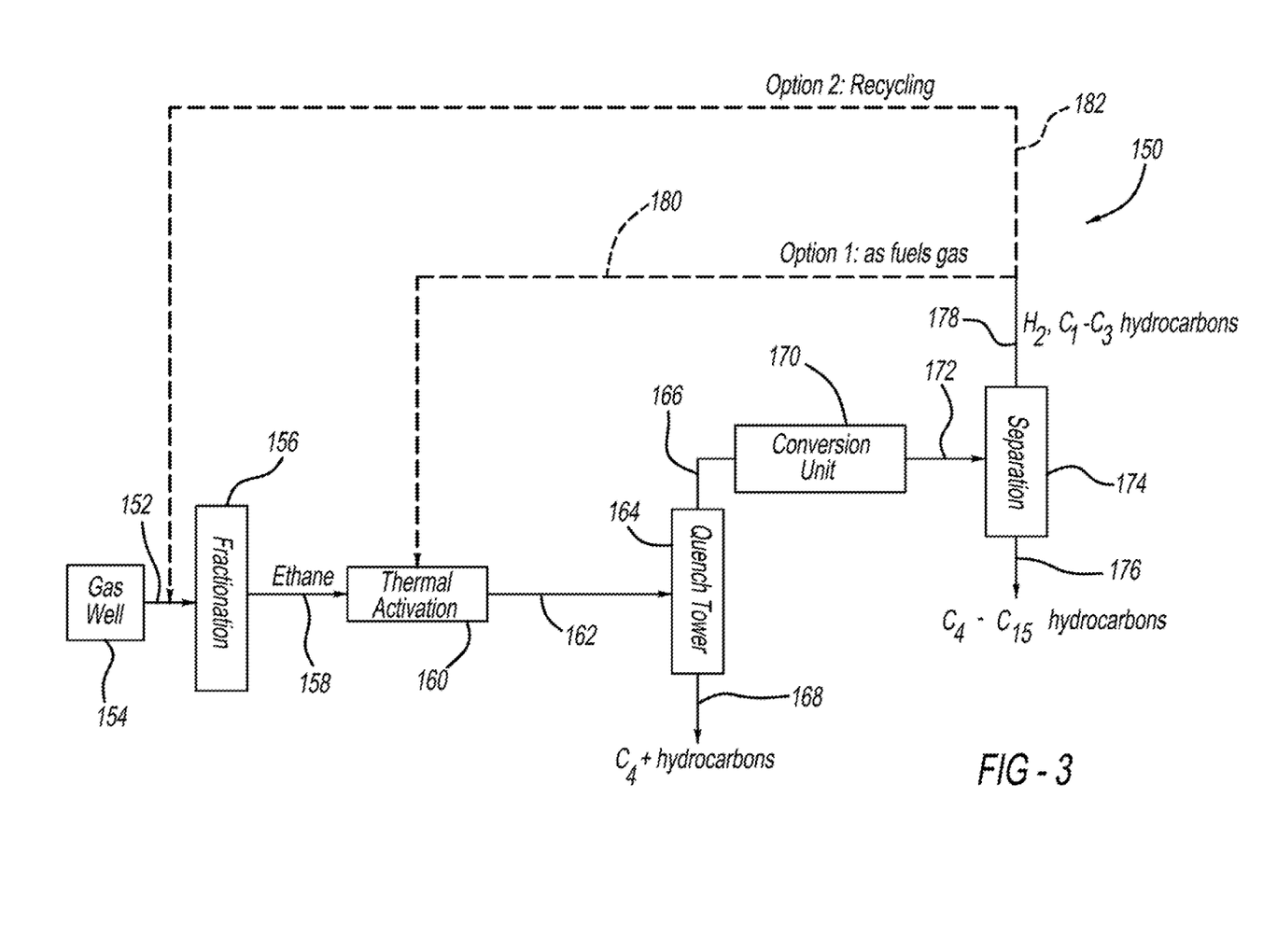
FIG. 3 is a schematic diagram depicting components and a process for converting ethane gas to liquid fuels.

Turning to FIG. 3, a schematic diagram depicts components used in a process to convert ethane gas to liquid fuels 150. More specifically, an ethane stream 152 from a gas well 154, for example, may be directed directly from gas well 154 into a fractionator 156 for fractionation. Upon undergoing fractionation in fractionator 156, a post-fractionator ethane stream 158 directly enters thermal activation unit 160 where heat is added. More specifically, ethane in post-fractionator ethane stream 158 is activated at the temperature of 500° C. Celsius to 1000° C. Celsius to produce an activated stream 162 exiting thermal activation unit 160 consisting of hydrogen, methane, unconverted ethane, ethylene, acetylene, propane, propylene, acid gases, and other products. Activated stream 162 is conveyed directly from thermal activation unit 160 into a quench tower 164 to quench the activated stream. A hydrocarbon stream 168 may exit quench tower 164 comprising $C_4$+ hydrocarbons. Also exiting quench tower 164 is a quenched stream 166 that is directed directly into a conversion unit 170 where an oligomerization catalyst, such as zeolite (e.g. ZSM-5 zeolite), converts the quenched stream 166 to a mixed product stream 172 that exits conversion unit 170 and contains $C_1$-$C_{15}$ hydrocarbons and hydrogen. Mixed product stream 172 is conveyed directly into a separation unit 174 and is separated into two streams, a $C_4$-$C_{15}$ hydrocarbon stream 176 to be used as gasoline and diesel fuels, and a hydrogen ($H_2$) and a light hydrocarbon stream 178 comprising $C_1$-$C_3$ hydrocarbons.

There are two utilization options for light hydrocarbon stream 178. A first flow option is depicted with flow path 180, in which hydrogen ($H_2$) and light hydrocarbon stream 178 are utilized as a fuel gas in the ethane thermal activation unit 160. In other words, as flow path 180 in FIG. 3 depicts, hydrogen ($H_2$) and light hydrocarbon stream 178 is conveyed directly back into thermal activation unit 160. A second flow option is depicted as flow path 182, in which hydrogen ($H_2$) and light hydrocarbon stream 178 are utilized as a recycling stream and a feed for the fractionator 156, since flow path 182 connects to ethane stream 158 just upstream from fractionator 156.

Table 1 below depicts conversion unit performance for catalyst ZSM-5 under the following conditions: 310° C. Celsius, 50 psig, 1.0 hr$^{-1}$ (Ethylene WHSV), $H_2$/$N_2$/Ethylene/$H_2O$.

TABLE 1

Oligomerization unit performance with a zeolite catalyst.

| Catalyst | ZSM-5 |
|---|---|
| Pressure, psig | 50 |
| Temperature, ° C. Celsius | 310 |
| Ethylene conversion, % | 98 |
| HC product selectivity, wt % | |
| Methane | 0.1 |
| Ethane | 0.8 |
| Propane | 2.1 |
| Propylene | 1.9 |
| Butanes | 9.3 |
| Butenes | 5.5 |
| C5+ | 80.2 |
| Total, % | 100.00 |

Table 1 demonstrates that a ZSM-5 catalyst converted a raw ethylene stream to a hydrocarbons stream with a selectivity to $C_5$+ liquid hydrocarbons of ~80 wt. %.

Figure 4:
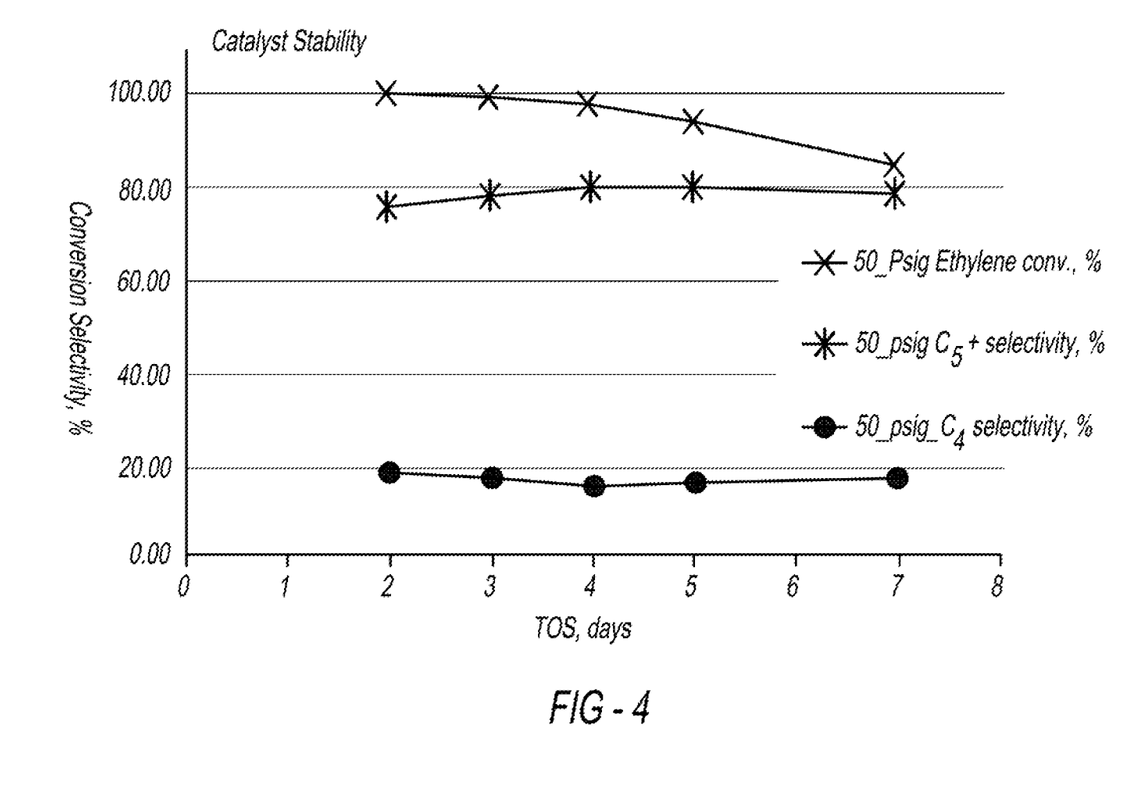
FIG. 4 is a graph depicting conversion selectivity percentage versus TOS in days.

FIG. 4 is a graph depicting conversion selectivity percentage versus time on stream (TOS) in days. FIG. 4 shows that the catalyst activity remained above 85% over 7 days of on stream operation, while selectivity to hydrocarbon products comprising five or more carbons remained approximately 80%.

Table 2 below depicts liquid product quality in a detailed hydrocarbon analysis for a liquid sample collected on the second day of on-stream operation. Table 2 shows that the liquid hydrocarbon product is a viable gasoline blending stock.

TABLE 2

Hydrocarbon Product Analysis from Oligomerization Unit

| GROUP | Wt % |
|---|---|
| Paraffin | 5.9 |
| I-Paraffins | 24.3 |
| Aromatics | 44.5 |
| Naphthenes | 10.1 |
| Olefins | 7.9 |
| Unidentified | 5.9 |
| C15 Plus | 1.4 |
| Total | 100.0 |
| Calculated RON | 97.5 |
| Calculated MON | 80.1 |
| RVP (psi) | 4.6 |

Figure 5:
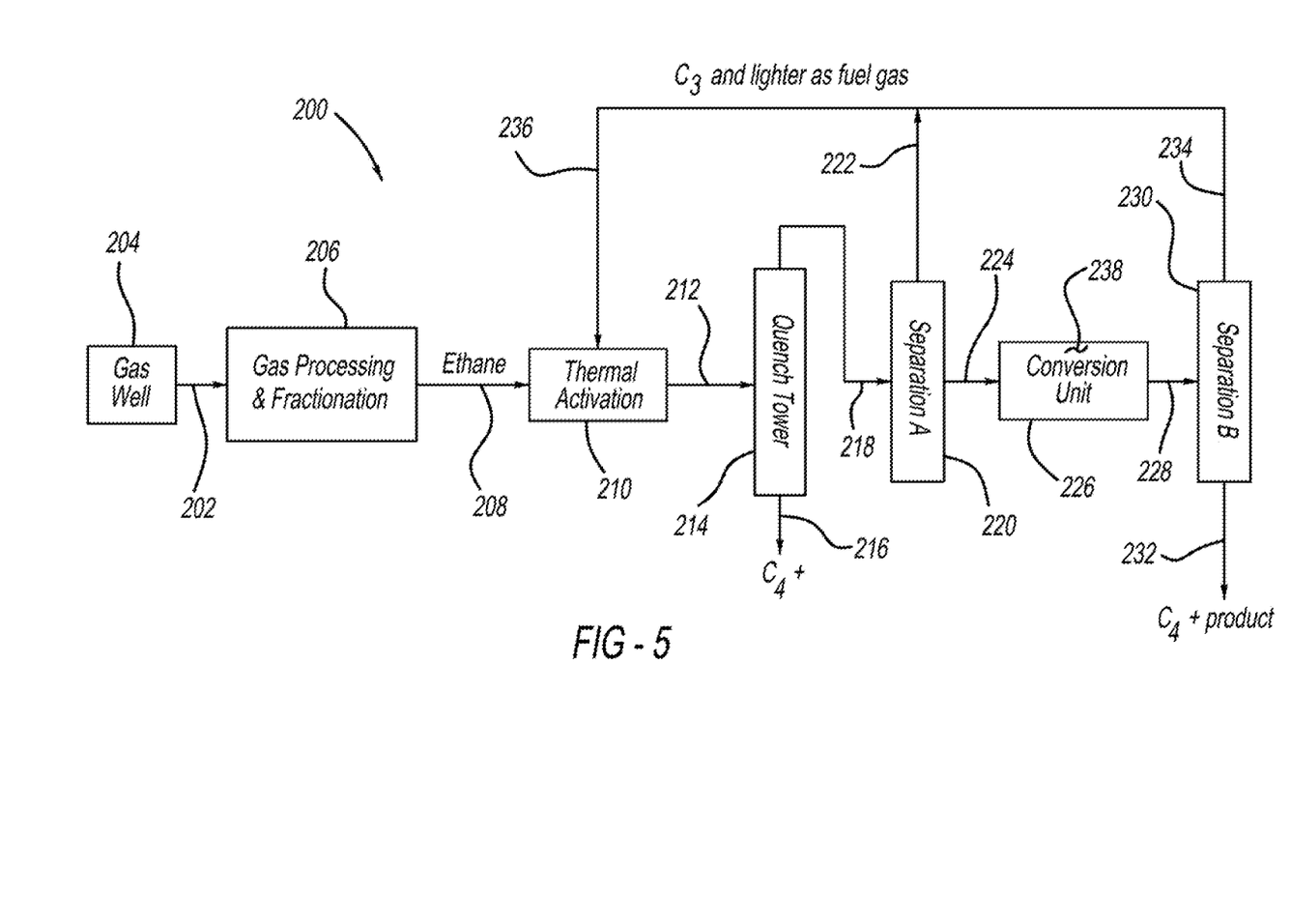
FIG. 5 is a schematic diagram depicting components and a process for converting ethane gas to liquid fuels.

Turning now to FIG. 5, a schematic diagram depicts components used in a process to convert ethane gas to liquid fuels 200. More specifically, an ethane stream 202 from a gas well 204, for example, may be conveyed directly from gas well 204 into a fractionator 206 for fractionation and associated gas processing. Upon undergoing fractionation in fractionator 206, a post-fractionator ethane stream 208 directly enters thermal activation unit 210 where heat is added to make the temperature of the ethane 500° C. Celsius to 1000° C. Celsius (inclusive). More specifically, ethane in post-fractionator ethane stream 208 is activated by heating to the temperature range of 500° C. Celsius to 1000° C. Celsius to produce an activated stream 212 that exits thermal activation unit 210 and consists of hydrogen, methane, unconverted ethane, ethylene, acetylene, propane, propylene, acid gases, and other products. The activated stream 212 may be a raw ethylene stream.

Activated stream 212 is conveyed directly from thermal activation unit 210 into a quench tower 214 to quench the activated stream 212. A hydrocarbon stream may exit quench tower 214 and be a $C_4+$ hydrocarbon stream 216. Also exiting quench tower 214 is a quenched stream 218 that is directed directly into a first separation unit 220. Within first separation unit 220, quenched stream is separated into a hydrogen (H2) stream 222 and another first separation unit exiting stream 224. First separation unit exiting stream 224 is conveyed directly into conversion unit 226 where oligomerization reactions occur to produce a $C_{1-15}$ stream. From conversion unit 226, a converted product stream 228 that exits conversion unit 226 is directed directly into a second separation unit 230 where it is separated into two streams, a $C_4+$ hydrocarbon stream 232 that may be used as gasoline and/or diesel fuel blendstock, and a $C_3$ and lighter product stream 234 into which hydrogen stream 222 is blended to form a hydrogen and $C_3$ and lighter product stream 236 that is then conveyed directly into thermal activation unit 210. Optionally, to improve the efficiency of the process, the $C_3$ and lighter product stream 234 can instead be recycled to the activation reactor (without hydrogen 222) by combining the $C_3$ and lighter product stream 234 with ethane stream 208.

There are multiple advantages of the process to convert ethane gas to liquid fuels 200. In one advantageous step, thermal activation of ethane in thermal activation unit 210 produces a raw ethylene stream simply and easily. Another advantage is using raw ethylene in a conversion unit to produce liquid fuels such as gasoline and diesel fuel because using raw ethylene results in lowering the costs of separating impurities from ethylene. Yet another advantage of process 200 is the option to remove hydrogen in a hydrogen stream 222 from the first separation unit 220. Hydrogen is a byproduct of thermal activation in thermal activation unit 210. By removing hydrogen in hydrogen stream 222 before first separation unit exiting stream 224 reaches conversion unit 226 and second separation unit 230, the quality and conversion of first separation unit exiting stream 223 to $C_4+$ hydrocarbon stream 232 may be improved.

Separation of hydrogen from quenched stream 218 may be accomplished in first separation unit 220 by using pressure swing adsorption, membranes, or cryogenic separation. Removing hydrogen in hydrogen stream 222 and thereby removing hydrogen from first separation unit exiting stream 224, which is the feed into conversion unit 226, provides more flexibility in the choice of a catalyst 238 and operating conditions. For example, removing hydrogen allows the use of metal based catalysts such as Ni-ZSM-5 in process 200, and more specifically, in conversion unit 226. Without hydrogen removal as explained above, the use of metal-based catalysts such as Ni-ZSM-5 would lead to hydrogenation of the ethylene produced in the thermal activation step being converted back into ethane. Removing hydrogen in hydrogen stream 222 also permits operation of conversion unit 226 under milder conditions of pressure and temperature which permits a corresponding reduction in capital and operating costs.

Figure 6:
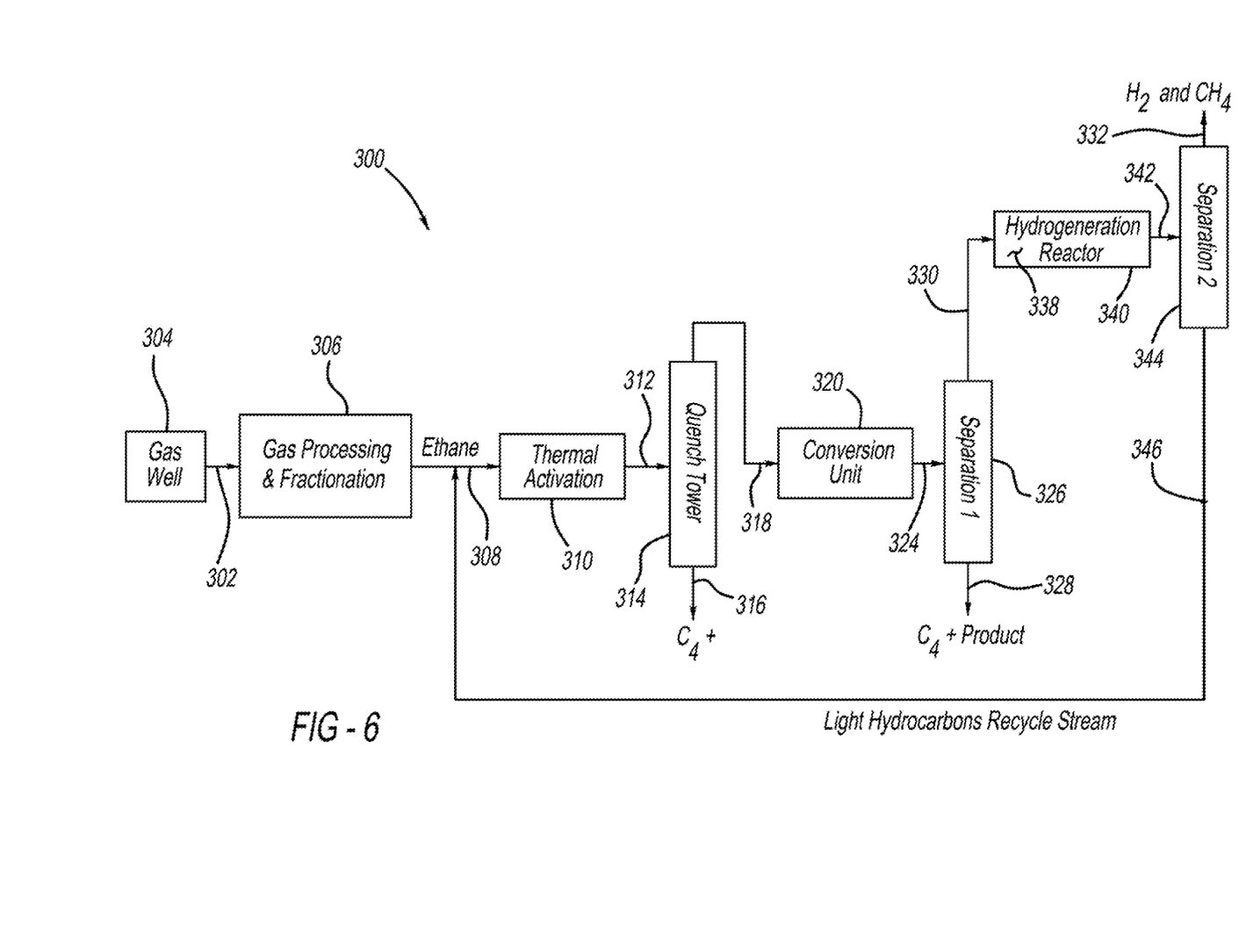
FIG. 6 is a schematic diagram depicting components and a process for converting ethane gas to liquid fuels.

Turning now to FIG. 6, a schematic diagram depicts components used in a process to convert ethane gas to liquid fuels 300. More specifically, an ethane stream 302 from a gas well 304, for example, may be directed directly from gas well 304 into a fractionator 306 for fractionation and associated gas processing. Upon undergoing fractionation in fractionator 306, a post-fractionator ethane stream 308 directly enters thermal activation unit 310 where heat is added to make the temperature of the ethane 500° C. Celsius to 1000° C. Celsius (inclusive). More specifically, ethane in post-fractionator ethane stream 308 is activated by heating to the temperature range of 500° C. Celsius to 1000° C. Celsius to produce an activated stream 312 that exits thermal activation unit 310. Activated stream 312 may be a gaseous product that includes hydrogen, methane, unconverted ethane, ethylene, acetylene, propane, propylene, acid gases, and other products. The activated stream 312 may be a raw ethylene stream.

Activated stream 312 is conveyed directly from thermal activation unit 310 into a quench tower 314, thereby quenching the activated stream 312. Two streams exit quench tower 314, including a $C_4+$ hydrocarbon stream 316 and a quenched stream 318 comprising light olefin that is conveyed directly into a conversion unit 320 where oligomerization and cyclization occur. A conversion unit exiting stream 324 exits conversion unit 320 and passes directly into first separation unit 326. First separation unit 326 separates conversion unit exiting stream 324 into two exiting streams, a $C_4+$ hydrocarbon stream 328 that can be utilized as blendstock for hydrocarbon product fuels (e.g. gasoline and diesel), and a first separation unit exiting stream 330 that is conveyed directly into a hydrogenation reactor 340 that employs an internal catalyst 338, such as Ni-ZSM-5.

Upon exiting hydrogenation reactor 340, post-hydrogenation reactor stream 342 is directed directly into a separation unit 344 where, using conventional separation technology, two exiting streams are formed. A first post-separation unit stream 332 may be a stream including $H_2$ and $CH_4$. A second stream may be a lighter product stream 346, which may comprise $C_3$ and lighter hydrocarbons that may be recycled and combined with post-fractionator ethane stream 308 that is fed into thermal activation unit 310, thereby increasing efficiency of the process.

There are multiple advantages to the process to convert ethane gas to liquid fuels 300 that is depicted in FIG. 6. In one advantageous step, thermal activation of ethane in thermal activation unit 310 produces a raw ethylene stream simply and easily. Another advantage is the use of raw ethylene in a conversion unit 320 to produce blendstock for liquid fuels (such as gasoline and diesel fuel) because utilizing raw ethylene lowers the cost associated with separating impurities from ethylene prior to use.

Figure 7:
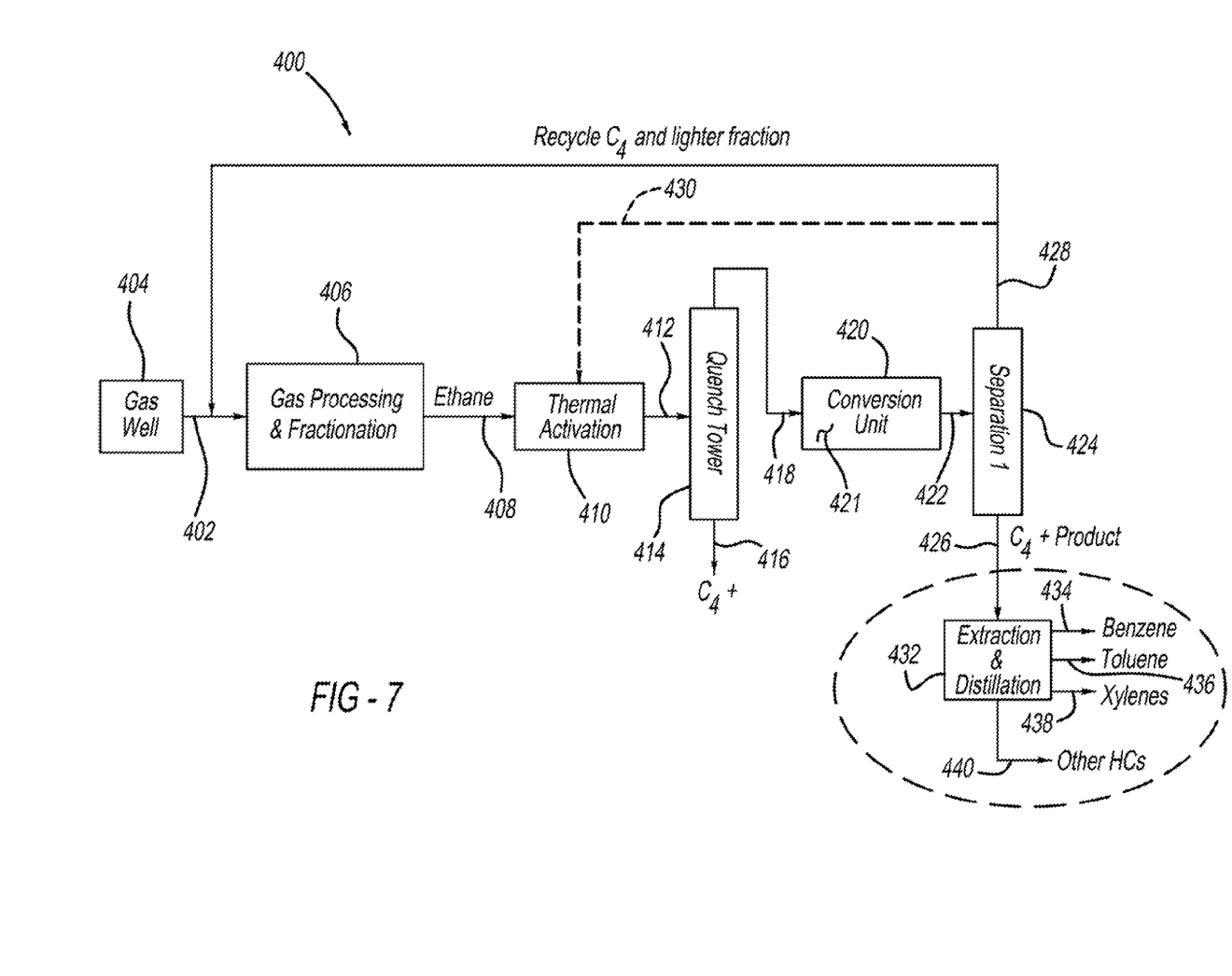
FIG. 7 is a schematic diagram depicting components and a process for converting ethane gas to liquid fuels.

FIG. 7 depicts components used in a flow process to convert ethane gas to chemicals 400. Turning to FIG. 7, a raw ethane stream 402 from a gas well 404, for example, may be directed directly from gas well 404 into a fractionator 406 for fractionation. Upon undergoing fractionation in fractionator 406, a post-fractionator ethane stream 408 directly enters thermal activation unit 410 where heat is added. More specifically, ethane in post-fractionator ethane stream 408 is activated, or cracked, in the presence of steam at a temperature from 500° C. Celsius to 1000° C. Celsius (inclusive) to produce an activated stream 412 exiting thermal activation unit 410 consisting of hydrogen, methane, unconverted ethane, ethylene, acetylene, propane, propylene, acid gases, and other products. Activated stream 412 is directed from thermal activation unit 410 directly into a quench tower 414 to quench the activated stream 412. Quenching the products of steam cracking is conventional in nature and thus, will not be described in greater detail herein.

A hydrocarbon stream 416 may exit quench tower 414 and be a stream of $C_4+$ hydrocarbons. Also exiting quench tower 414 is a quenched stream 418 that is conveyed directly into a conversion unit 420 where a catalyst, such as zeolite (e.g. ZSM-5 zeolite), converts the quenched stream 418 to a mixed product stream 422 comprising $C_1$-$C_{15}$ hydrocarbons and hydrogen that exits conversion unit 420. Mixed product stream 422 is conveyed directly into a separation unit 424 where it is separated into two streams, a $C_4+$ hydrocarbon stream 426, which may be a $C_4$-$C_{15}$ hydrocarbon stream to be used as blendstock for gasoline and diesel fuels, and a mixture comprising hydrogen ($H_2$) and $C_3$ and lighter fraction hydrocarbon stream, also known as a light hydrocarbon stream 428.

There are two main utilization options for light hydrocarbon stream 428. A first utilization option is depicted such that light hydrocarbon stream 428 is directed back in a recycle path to combine with ethane stream 402 just upstream from fractionator 406. A second utilization option is depicted such that light hydrocarbon stream 428 is directed via recycle path 430 as fuel for thermal activation unit 410. As FIG. 7 depicts, optional flow path 430 conveys the hydrogen ($H_2$) and $C_1$-$C_3$ hydrocarbons in light hydrocarbon stream 428 directly back into thermal activation unit 410.

With continued reference to FIG. 7, $C_4+$ hydrocarbon stream 426 exits separation unit 424 and may be directed into an extraction and distillation unit 432. Products such as benzene 434, toluene 436, xylene 438 and other hydrocarbon products 440 exit from extraction and distillation unit 432 after processing within extraction and distillation unit 432.

Although extraction and distillation unit 432 has been described in conjunction with FIG. 7, extraction and distillation unit 432 could optionally be coupled to any embodiments of the processes described herein that produce a $C_4+$ hydrocarbon stream (that may be a $C_4$-$C_{15}$ hydrocarbon stream), that may be used as the input stream for an extraction and distillation unit to produce chemicals, such as benzene, toluene, xylene and other hydrocarbon products.

Certain embodiments pertain to the co-conversion of a combination of activated ethane and bio-derived ethanol to transportation fuels. These embodiments allow incorporation of greater quantities of biomass-derived ethanol into transportation fuels without raising the actual ethanol content of the finished fuel above about 10 wt. %. Table 3 below depicts conversion unit performance for a co-feed of ethane and ethanol. Feed 1 comprised a mixture of ethylene/$H_2$/$N_2$/$H_2O$ (ratio of 33/36/23/8 by volume) fed with an ethylene weight hour space velocity (WHSV) of 1.0 $hr^{-1}$. Feed 2 was ethanol fed at 2 g/hr (per 5 g catalyst). The zeolite catalyst ZSM-5 was contacted with the mixture under the following conditions: 310° C., 0 psig, 1.0 $hr^{-1}$ (Ethylene WHSV), $H_2$/$N_2$/Ethylene/$H_2O$

TABLE 3

| Product Selectivity from the Co-conversion of Activated Ethane and Ethanol | |
|---|---|
| Ethylene Conversion, wt. % | 86.5 |
| Ethanol Conversion, wt. % | ~100 |
| Product Selectivity, wt. % | |
| Methane | 0.0 |
| Ethane | 0.4 |
| Propane | 2.4 |
| Propylene | 5.3 |

TABLE 3-continued

| Product Selectivity from the Co-conversion of Activated Ethane and Ethanol | |
|---|---|
| Butanes | 11.3 |
| Butenes | 11.2 |
| C5+ Products | 69.4 |
| Total, wt % | 100.0 |

Figure 8:
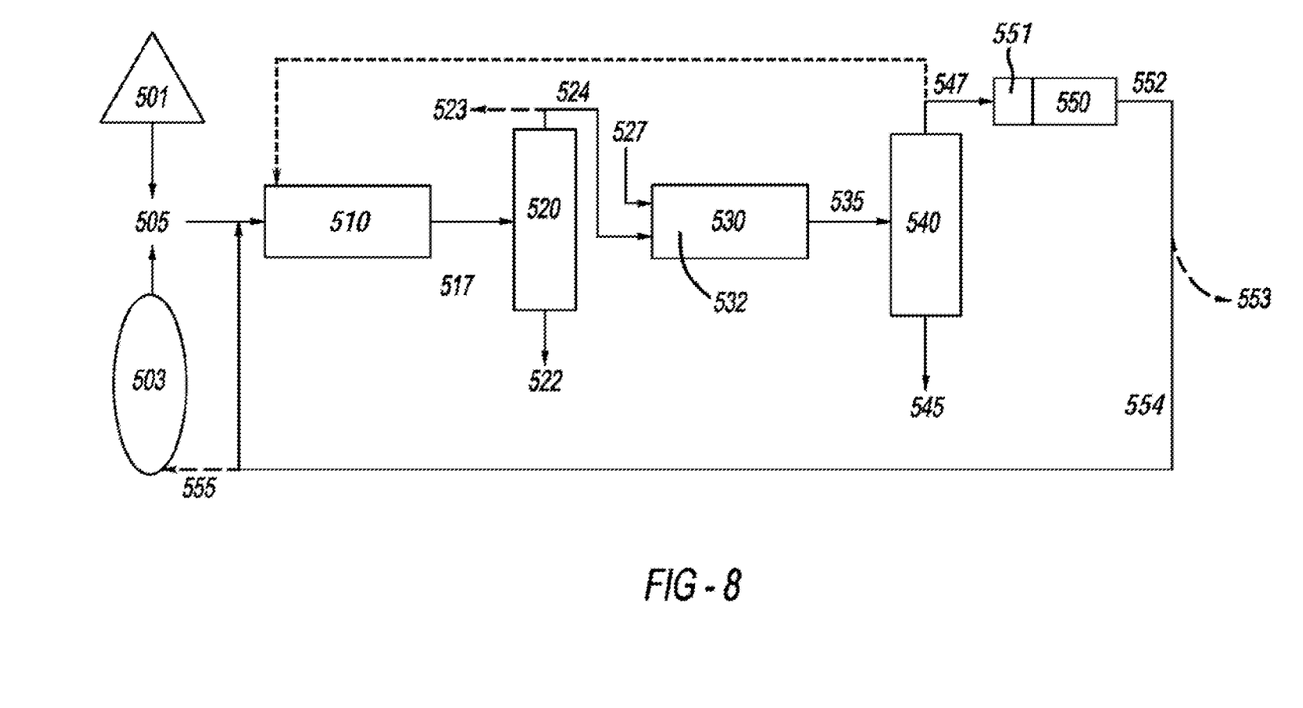
FIG. 8 is a schematic diagram depicting components and a process for converting a mixture of ethane gas and bio-derived ethanol to liquid fuels.

FIG. 8 details components of an exemplary process and system. An ethane stream 505, which may be either a raw ethane stream from a gas well 501 or a more concentrated and purified ethane stream from a natural gas fractionator 503, directly enters thermal activation unit 510 where heat and steam activate, or crack, the raw ethane steam at a temperature ranging from 500° C. to 1000° C. (inclusive) to produce an activated stream 517 exiting the thermal activation unit 510. Such cracking is conventional and so will not be discussed in greater detail herein. The activated stream 517 comprises hydrogen, methane, unconverted ethane, ethylene, acetylene, propane, propylene, acid gases, and other products, and is rapidly quenched in quenching unit 520 to stop the cracking reaction. In certain embodiments, quenching the activated stream 517 may be performed using a quench agent comprising water or a solvent. A hydrocarbon stream 522, which may be a $C_4+$ hydrocarbon stream, exits quench unit 520. The hydrocarbon stream 522 may be cooled and returned to the quench unit 520 to serve as quench agent for the activated stream 517. Also exiting quench unit 520 is quenched stream 524 generally comprising hydrocarbons having a carbon backbone of three carbons or fewer.

Further referring to FIG. 8, the quenched stream 524 leaving quench unit 520 is directed into the conversion unit 530. In the embodiment shown, a first hydrogen stream 523 may be separated from the quenched stream 524 leaving quench unit 520. A separate stream of bio-derived ethanol 527 is pre-heated to vapor phase and also conveyed directly into the conversion unit 530 where it contacts the quenched stream 524 to form a mixture. Any molar ratio of bio-derived ethanol stream 527 to quenched stream 524 may be used. In certain embodiments, the ethanol in the bio-derived ethanol stream 527 is present in larger quantities (on a molar basis) than the quantity of ethylene in the quenched stream 524.

Conversion unit 530 is maintained at a temperature ranging from 100° C. to 500° C., optionally 110° C. to 400° C., and a pressure ranging from about 1 to 20 bar. In general, the temperature within the conversion reactor must be sufficient to prevent condensation of any water that is present, including water that is fed to the conversion unit 530 as a component of the raw ethanol stream 527. This prevents damage to the catalyst within the conversion unit, particularly if the catalyst comprises a metal. Alternatively, a certain quantity of water may be removed from the raw ethanol stream 527 prior to entering the conversion unit 530. Techniques for achieving this separation may include distillation, pervaporation (such as in the presence of a zeolite membrane) or any other conventional separation methodology. In certain embodiments, the raw ethanol stream 527 may comprise from 5 to 95 volume percent water, inclusive. In certain embodiments, the raw ethanol stream 527 may comprise up to 5, 10, 15, 20, 40, 60, 80, or even as much as 95 volume percent water, inclusive, without adversely affecting conversion of the ethanol stream to hydrocarbons by the catalyst within the conversion reactor (depending upon the sensitivity of the oligomerization catalyst utilized to deactivation by water vapor). In certain embodiments, the wt. % of water in the raw ethanol stream may find an upper limit due to an unacceptable level of hydration of ethylene to ethanol, although this upper limit is likely to vary significantly depending upon the catalyst utilized and the conditions of temperature and pressure utilized in the conversion reactor.

An alkylation catalyst or oligomerization catalyst 532 contained within conversion unit 530 converts the mixture to a mixed product stream 535 that exits conversion unit 530 and comprises $C_1$-$C_{15}$ hydrocarbons and hydrogen. Mixed product stream 535 is directed into a separation unit 540 where it is separated into two streams: a $C_4$+ hydrocarbon stream 545, that in certain embodiments may be a $C_4$-$C_{15}$ hydrocarbon stream to be used as blend stock for gasoline and diesel fuels, and a light hydrocarbon stream 547 comprising $C_1$-$C_3$ hydrocarbons.

Further referring to the embodiment depicted in FIG. 8, the light hydrocarbon stream 547 is directed to a hydrogenation reactor 550 containing a hydrogenation catalyst 551. The light hydrocarbon stream 547 contacts the hydrogenation catalyst 551 at conditions of temperature and pressure that facilitate at least partial saturation of the hydrocarbons in the light hydrocarbons stream 547 to produce a recycle stream 552. A second hydrogen stream 553 may optionally be separated from the recycle stream 554 to produce a second recycle stream 554. The second recycle stream 554 may be recycled as additional feedstock for the activation unit 510 or alternatively recycled as feedstock 555 for a natural gas fractionator 503 that produces raw ethane stream 505. Light hydrocarbons stream 547 may optionally be directed back to the thermal activation unit 510.

The catalyst used in the conversion unit for any embodiment may comprise any catalyst suitable for addition/alkylation/oligomerization reactions that is capable of facilitating the production of larger hydrocarbons comprising four or more hydrocarbons from small hydrocarbons comprising 3 or less carbons. Such catalysts are preferably resistant to the presence of water in the reactor. In certain embodiments, the catalyst may a solid acid, such as sulfated zirconia, heteropolyacids such as, for example, 12-tungstophosphoric acid, or acidic organic polymers such as sulfonic acid resins. Non-solid acid catalysts are generally not preferred as they are typically inactivated by any significant quantity of water in the reaction. Preferably, an advantage of the system and process is to avoid any required separation of water from the raw ethanol stream prior to feeding this stream to the conversion reactor, as this would increase costs and reduce commercial viability of the system and process. Use of catalysts comprising metal may be facilitated by separating hydrogen from the quenched stream prior to directing the quenched stream to the conversion unit containing the catalyst (as depicted in FIG. 8), although in certain embodiments, the presence of steam in the conversion reactor may serve to reverse the inhibitory effect of hydrogen gas on the activity of metal catalysts, allowing the use of such catalysts without requiring separation of hydrogen from the quenched stream.

In certain embodiments, the catalyst may comprise any type of zeolite that is capable of catalyzing reactions between hydrocarbons to produce a higher molecular weight hydrocarbon. Such zeolites may be, but are not limited to, zeolites of one or more of the following categories: Y, X, MFI, FAU, beta, HY, EMT, USY, MOR, LTL BEA, MCM, ZSM, REY, REUSY and SAPO. The catalyst may also be impregnated with a metal, such as, for example, a rare earth metal, alkali metal, or alkaline earth metal. In certain embodiments, the aluminum of the zeolite structure can be totally or partially substituted by poor metals such as, for example, B, Ga, or Fe. An extensive characterization of such catalysts and structural or substituted variants is well known in the art.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

DEFINITIONS

As used herein, the term "bio-derived" is defined as any substance sourced or derived from biological material or biomass.

We claim:

1. A system for converting ethane to liquid fuels, comprising:
  a) an ethane stream;
  b) a thermal activation unit adapted to operate at an internal temperature of between about 500° C. and about 1000° C. and comprising:
    at least one inlet for receiving the ethane stream, said thermal activation unit adapted to convert the ethane stream to products comprising an intermediate hydrocarbon stream and a raw ethylene stream comprising less than 60 weight percent ethylene,
    at least a first outlet for the intermediate hydrocarbon stream,
    at least a second outlet for the raw ethylene stream;
  c) a conversion unit adapted to operate at an internal temperature of between about 20° C. and 400° C. and comprising:
    at least one catalyst contained within the conversion unit,
    at least a first inlet adapted to receive the raw ethylene stream,
    at least a second inlet adapted to receive a raw ethanol stream that is derived from biomass and comprises at least 4 volume percent water,
    wherein the arrangement of the at least one first inlet and the at least one second inlet on the conversion unit are adapted to facilitate rapid mixing of the raw ethylene stream with the raw ethanol stream to form a mixture and convert the water to steam prior to contacting the at least one catalyst,
    at least one outlet to convey a mixed product stream to a separation column; and
  d) a separation column adapted to receive and separate the mixed product stream into an intermediate hydrocarbon stream comprising hydrocarbons containing four or more carbon atoms and a light hydrocarbon stream comprising hydrocarbons containing from one to three carbon atoms.

2. The system according to claim 1, further comprising:
  e) a fractionator adapted to separate the intermediate hydrocarbon stream into a gasoline fraction suitable for blending into gasoline fuel, and a diesel fraction suitable for blending into diesel fuel.

3. The system according to claim 1, further comprising a separator adapted to receive the raw ethylene stream and to separate a hydrogen stream from the raw ethylene stream prior to combining the raw ethylene stream with the raw ethanol stream.

4. The system according to claim 1, wherein the thermal activation unit is adapted to produce a raw ethylene stream comprising less than 40 weight percent ethylene.

5. The system according to claim 1, wherein the raw ethanol stream comprises at least 20 weight percent water.

6. The system according to claim 1, wherein the raw ethanol stream comprises at least 40 weight percent water.

7. The system according to claim 1, wherein the raw ethanol stream comprises at least 60 weight percent water.

8. The system according to claim 1, wherein the catalyst comprises a solid phosphoric acid catalyst, zeolite catalyst, Ni-containing catalyst or mixtures thereof.

9. The system according to claim 1, further comprising:
f) a hydrogenation reactor adapted to receive and hydrogenate at least part of the light hydrocarbon stream and produce a mixture comprising light paraffins stream and hydrogen gas;
g) a separator adapted to receive the mixture and separate the hydrogen gas from the light paraffins stream;
h) a conduit adapted to receive and convey the light paraffins stream; and
i) a natural gas fractionator adapted to receive the light paraffins stream and produce the ethane stream.

10. The system according to claim 9, wherein the conduit is adapted to convey the light paraffins stream from the separator to the thermal activation unit.

11. The system according to claim 9, wherein the thermal activation unit is adapted to produce a raw ethylene stream comprising less than 40 weight percent ethylene.

12. The system according to claim 9, wherein the raw ethanol stream comprises at least 20 weight percent water.

13. The system according to claim 9, wherein the raw ethanol stream comprises at least 40 weight percent water.

14. The system according to claim 9, wherein the raw ethanol stream comprises at least 60 weight percent water.

15. The system according to claim 9, wherein the catalyst comprises a solid phosphoric acid catalyst, zeolite catalyst, Ni-containing catalyst or mixtures thereof.

* * * * *